Apr. 10, 1923.
P. W. FLEISCHER
1,451,015
AUTOMATIC CHAIN FEED ATTACHMENT
Filed Dec. 31, 1919
5 sheets-sheet 1
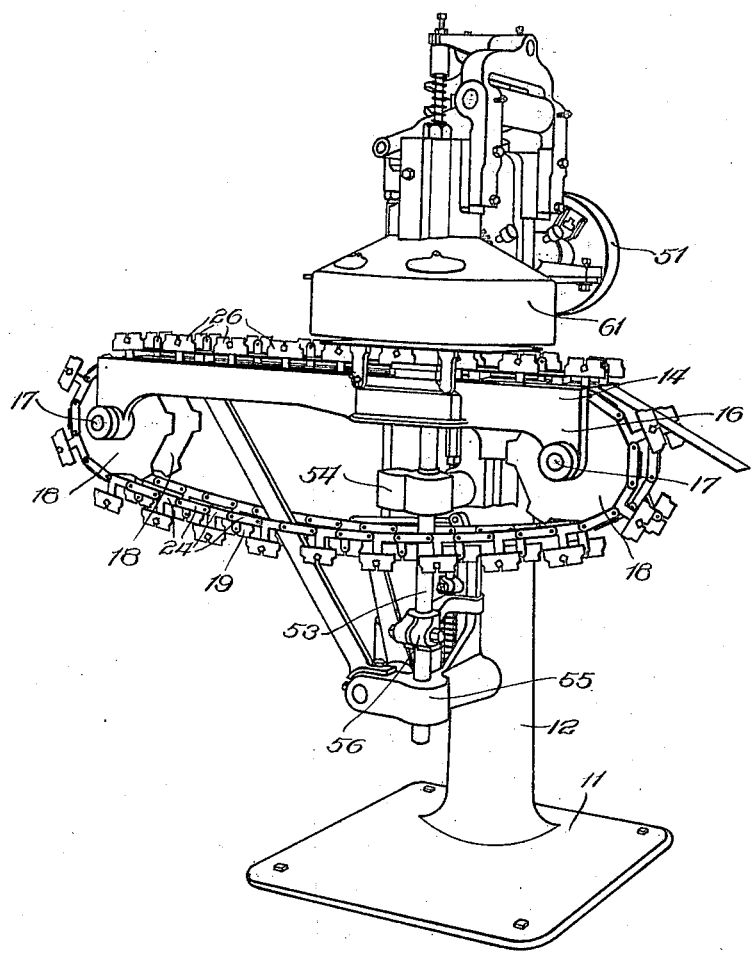
Fig. I.
WITNESSES:
INVENTOR
Paul W. Fleischer
BY
ATTORNEYS Apr. 10, 1923.
P. W. FLEISCHER
1,451,015
AUTOMATIC CHAIN FEED ATTACHMENT
Filed Dec. 31, 1919
5 sheets-sheet 2
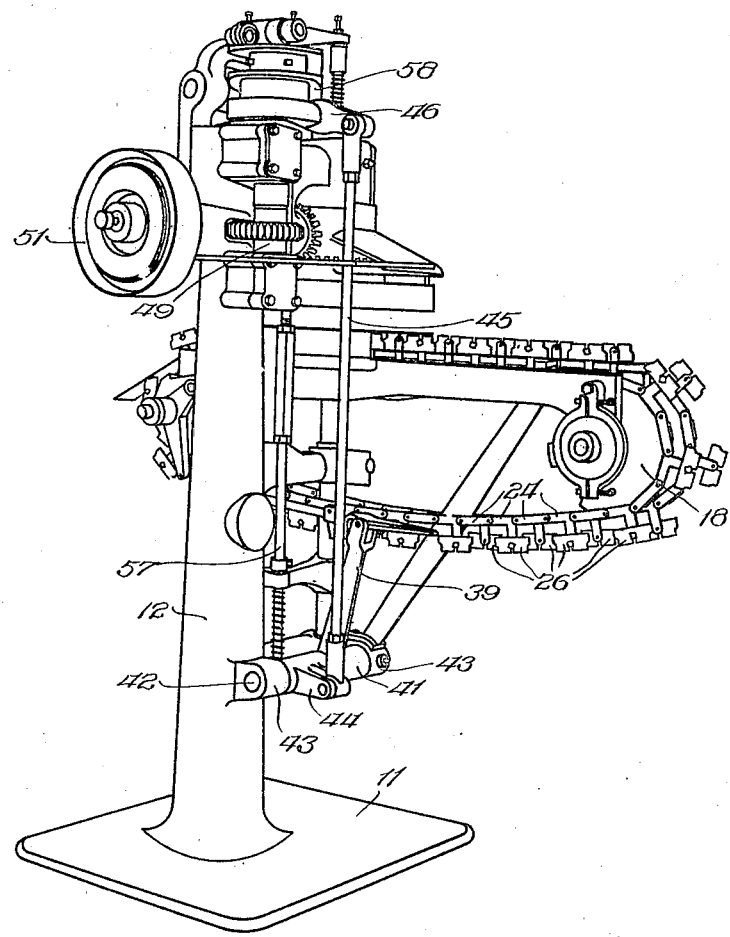
Fig. II.
WITNESSES:
TJOBrien
INVENTOR
Paul W. Fleischer
BY Munday Clarke
J Carpenter
his ATTORNEYS Apr. 10, 1923.
P. W. FLEISCHER
1,451,015
AUTOMATIC CHAIN FEED ATTACHMENT
Filed Dec. 31, 1919
5 sheets-sheet 3
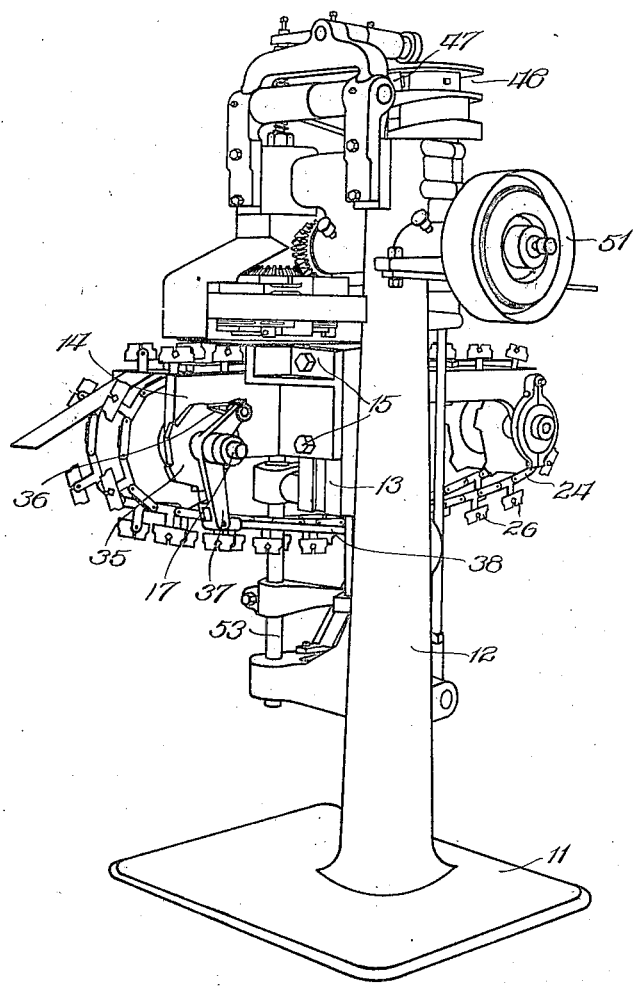
Fig. III
WITNESSES:
T.J.O'Brien
INVENTOR
Paul W. Fleischer
BY Munday Clarke
his ATTORNEYS Apr. 10, 1923.
P. W. FLEISCHER
1,451,015
AUTOMATIC CHAIN FEED ATTACHMENT
Filed Dec. 31, 1919 5 sheets-sheet 4
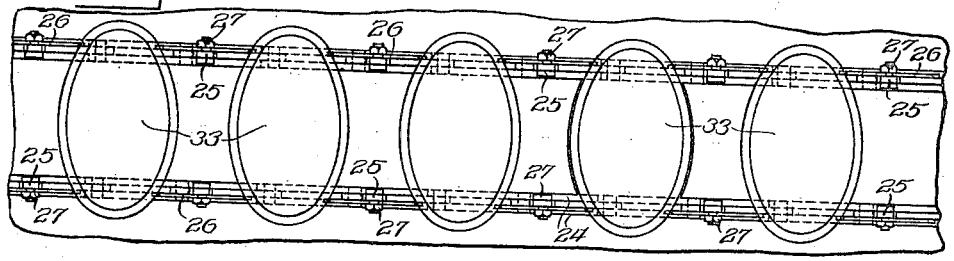
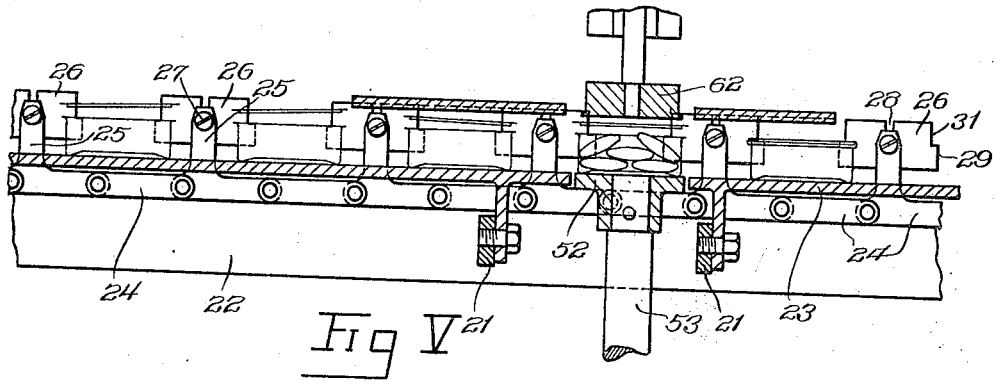
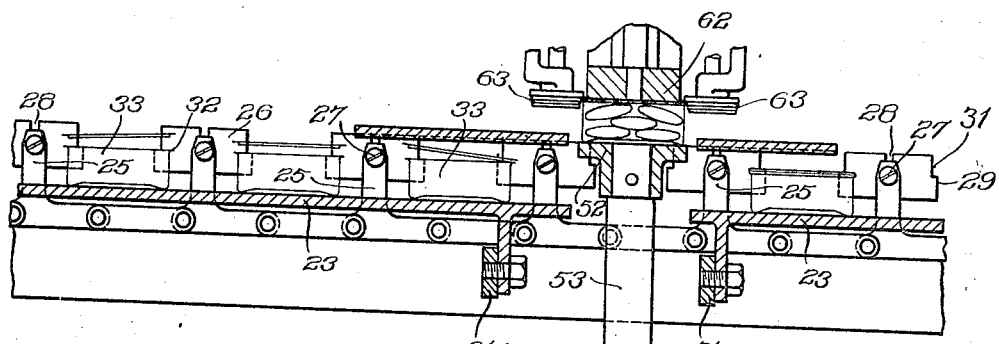
WITNESSES:
INVENTOR
Paul W. Fleischer
BY
ATTORNEYS Apr. 10, 1923.
P. W. FLEISCHER
1,451,015
AUTOMATIC CHAIN FEED ATTACHMENT
Filed Dec. 31, 1919
5 sheets-sheet 5
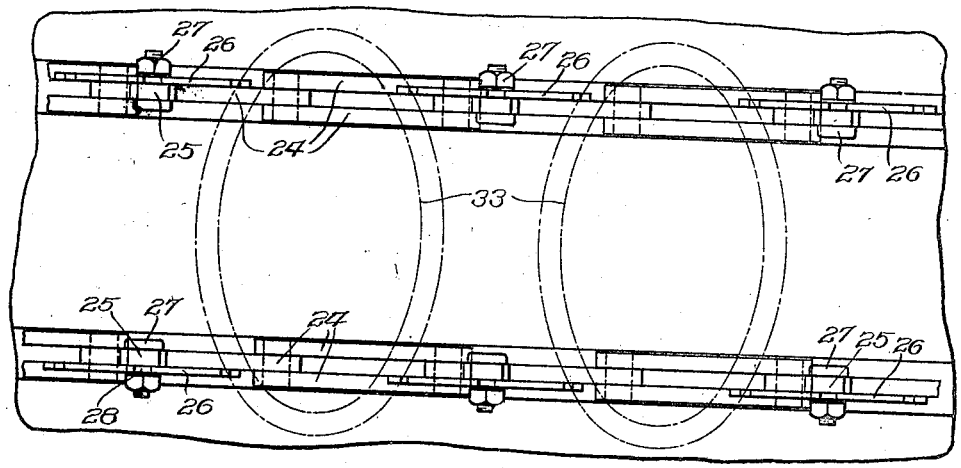
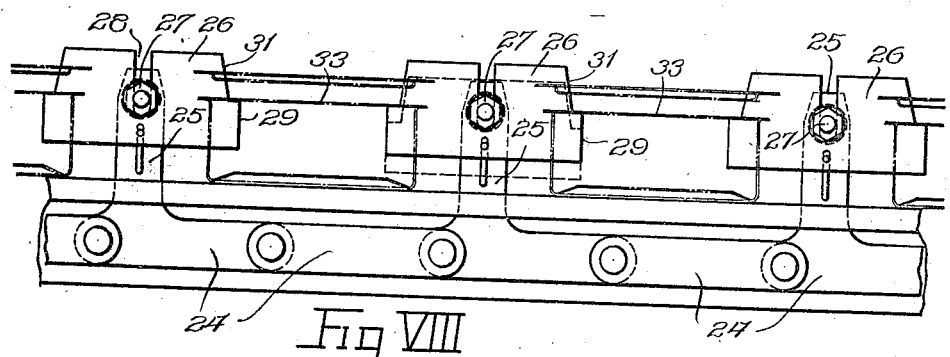

Patented Apr. 10, 1923.

1,451,015

UNITED STATES PATENT OFFICE.

PAUL W. FLEISCHER, OF WEEHAWKEN HEIGHTS, NEW JERSEY, ASSIGNOR TO AMERICAN CAN COMPANY, OF NEW YORK, N. Y., A CORPORATION OF NEW JERSEY.

AUTOMATIC CHAIN-FEED ATTACHMENT.

Application filed December 31, 1919. Serial No. 348,642.

*To all whom it may concern:*

Be it known that I, PAUL W. FLEISCHER, a citizen of the United States, residing in Weehawken Heights, in the county of Hudson and State of New Jersey, have invented a new and useful Improvement in Automatic Chain-Feed Attachments, of which the following is a specification.

This invention relates in general to machines for closing filled cans and has more particular reference to machines of this character adapted to operate upon cans of oval and other non-circular form.

Prior to my invention it has been frequently the custom to feed cans with their ends into the closing mechanism by hand and since the closing heads of such machines are usually large and of course mounted relatively close to the can lifting means the operator has little opportunity to see clearly that the ends and bodies are in accurate registration when they are in position to have the closing operation performed. On this account the operation of closing oval cans in the past has been a relatively slow one and it is a principal object of this invention to provide a high speed wholly automatic and accurately operating can closing machine wherein the flat bodies and the ends may be delivered to the closing machine as fast as the closing machine can operate upon them.

A further objection to the manual method of feeding the cans into the closing machine has resulted from the fact that where the cans were filled to capacity great difficulty was experienced in arranging the ends properly with respect to the can bodies at the time of closing even where considerable care was exercised, and my invention has for a further and highly important object the provision of a machine having automatic action which will permit oval cans filled to capacity to be fed to the closing mechanism and the covers placed accurately thereon.

A further object of the invention is the provision of conveying mechanism, parts of which will be readily detachable to permit replacement to accommodate cans of different sizes and the parts of which will be also adjustable to permit the accurate centering of each can end with respect to the can body to receive it.

Numerous other objects and advantages of the invention will be apparent as it is better understood from the following description, which taken in connection with the accompanying drawing discloses a preferred embodiment thereof.

Referring to the drawings,

Figure I is a front perspective view of a closing machine in which my present invention is embodied;

Fig. II and III are rear perspective views taken respectively from the left and right of Fig. I;

Fig. IV is an enlarged top plan view of a part of the conveyer mechanism;

Fig. V is a partial enlarged horizontal section through the same showing the arrangement at the seaming station and prior to the seaming operation;

Fig. VI is a view similar to Fig. V and showing the arrangement in forming the seam;

Fig. VII is a view similar to Fig. IV and still further enlarged; and

Fig. VIII is an enlarged partial side elevation.

For the purpose of illustrating my invention I have shown on the drawing a machine adapted to close filled oval cans, although it will be readily understood that the machine may be employed to close cans of other non-circular form and from certain aspects of the invention it may be adapted to close circular cans.

The machine shown on the drawing comprises a base 11 from which a post or pedestal 12 extends up and supports the operative parts. Located well up the post is a guide 13 on which a table or bed 14 is adjustably mounted by bolts 15. This table carries at each end depending arms or lugs 16 in which two shafts 17 are mounted. Upon each of these two shafts are provided two sprocket wheels 18, the arrangement thus being such that there are a pair of sprocket wheels at each end of the bed. Two chain conveyers 19 are trained over these sprocket wheels and move along the top of the bed on their operative travel. The sprocket chains are arranged in parallel vertical planes and for certain purposes of the invention may be considered to provide a single conveyer or conveying means as will be readily apparent.

The bed consists in cross supports 21 between side plates 22, said cross supports sustaining bed members 23 located between the side plates 22 and also between although slightly above the chain portion of the conveyer.

Each conveyer consists of chain links 24 from which arms 25 extend up at regular and predetermined intervals and these arms carry blades 26. The blades 26, as may be observed from the drawings (Figs. VII and VIII), are connected to the arms by bolts 27 which engage through slots 28 in the blades, this arrangement permitting the blades to be adjusted vertically as conditions may require. The ends of the blades are provided with outwardly extending shoulders 29 and with slightly inclined walls or surfaces 31 thereabove. The conveyers are spaced apart a distance to engage the ends of the oval cans with the flanges 32 of the cans which are indicated at 33 resting on the shoulders between adjacent conveyer units or blades. The blades are preferably adjusted so that the cans slide easily over the bed members, the conveyer units propelling them and holding them in registration by engagement with the shoulders 29 provided on adjacent faces of the blades. The ends are supported slightly above the blades by engagement with the inclined surfaces 31 of adjacent blades. This arrangement insures that the oval cans will be held in accurate position with respect to the directions of their longer and shorter axes until they arrive at the seaming station, and then the positions of their said axes will correspond with those of the similar axes of the chucking devices, it being understood that the two conveyers are spaced apart an appropriate distance to permit the proper holding and registration of the cans and the ends. The ends may tilt as indicated in Figs. V and VI without affecting the registration of the longer axis of the can body and end and when they are elevated to the seaming mechanism this tilting will be corrected and the shorter axes of said end and body also brought into parallelism.

The conveyers are propelled by a ratchet 35 mounted on the forward shaft 17 (Fig. III), it being understood that the sprockets and ratchet are all fast on this shaft. The ratchet 35 is advanced intermediately and between the seaming operations by a pawl 36 upon the end of a ratchet or pawl arm 37 pivoted on the shaft and connected by a link 38 with an arm 39 (Fig. II) of a rock sleeve 41 upon a fixed shaft 42 carried in bearings 43 from the post. The sleeve 41 is connected through arms 44 and rod 45 with a cam lever 46 having a roller 47 (Fig. III) engaging in a cam groove 48 of a cam upon the upper end of a shaft 49 which receives power through any suitable mechanism from a main driving pulley 51.

Each can with its end in registration between adjacent conveyer units is brought to rest over a lifter which is or may be in the form of a plunger 52 (Fig. V) located upon the upper end of a shaft or rod 53 in bearing arms 54 and 55 (Fig. I) extending out from the post 12. This rod or shaft 53 is provided with an arm 56 engaging upon the end of a vertical rod 57 which extends up for actuation through suitable mechanism from a cam groove 58 in the member with the groove 48, whereby the rod 57 lifts said plunger at timed intervals.

The general construction of the seaming mechanism need not be described except that it should be pointed out that a seaming head 61 is provided and is actuated in any usual or preferred fashion from the pulley 51. It might be mentioned, however, that this seaming head is provided with a cover seating device 62 (Fig. V) and seaming rolls 63 in accordance with the usual custom. The plunger moves up lifting the can, as may be seen by comparing Figs. V and VI, first into engagement with the end and then into engagement with the end seating member 62, lifting the end seating member into position to permit the rolls 63 to move about and seam the end to the body. The seaming mechanism, the plunger and numerous other parts of the closing mechanism are of well-known construction and will not require particular description or showing on the drawing.

It will be manifest that the conveyer brings the can bodies and the ends in accurate registration to the lifting plunger and that when this plunger lifts the can ends are accurately seated in place, i. e., the shoulders on the ends fitted within the bodies just prior to seaming.

It will be manifest that the blades of the conveyer may be easily and quickly removed and replaced with others of different size to permit of the conveying of cans of different sizes and that the entire conveyer with its bed may be easily adjusted vertically on the guide 13 in accordance with the change of height of can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for closing filled cans, the combination of seaming mechanism and endless chain conveyers movable therepast, and having speed means which support the cans and ends in spaced relation, said conveyers having means for preventing the ends rotating with respect to the bodies.

2. In a machine for closing filled cans, the combination of seaming mechanism and endless chain conveyers movable therepast and having spaced means which support the cans and ends in spaced relation, said conveyers having means for maintaining corresponding transverse dimensions of said cans and ends in accurate registration.

3. In a machine for closing filled cans, the combination of closing mechanism and endless chain conveyers having spaced conveyer units, adjacent faces of said units being arranged to receive between the cans and can ends in accurate registration, said adjacent faces holding the can ends in spaced relation above the cans.

4. In a machine for closing oval cans, the combination of closing mechanism and endless chain conveyers movable therepast, said conveyers having means for engaging can bodies and ends near the ends of said cans to maintain said cans and ends in accurate registration, said adjacent faces holding the can ends in spaced relation above the cans.

5. In a machine for closing oval cans, the combination of closing mechanism and endless chain conveyers movable therepast, said conveyers having means extending along upwardly and downwardly directed lines for engaging can bodies and ends near the ends of said cans to maintain the longer axes of the cans and ends in accurate registration.

6. In a machine for closing filled cans, the combination of a pair of spaced and parallelly moving endless chain conveyers and having conveyer units for supporting can bodies between them and for supporting ends in registration therewith, said units having means for spacing said ends above said can bodies.

7. In a machine for closing filled cans, the combination of closing mechanism, a pair of endless chain conveyers movable in parallel vertical planes and co-operating to support the sides of a filled can and convey it to said closing machine, said conveyers having means for engaging the can ends and spacing the same in alinement at a distance above said cans.

8. In a machine for closing filled cans, the combination of closing mechanism, a pair of endless chain conveyers movable in parallel vertical planes and co-operating to support the sides of a filled can and an end therefor and convey it to said closing machine, said conveyers having means for engaging and supporting the ends for the cans at a distance above their respective filled cans.

9. In a machine for closing filled cans, the combination of an endless conveyer composed of conveyer units having downwardly tapered adjacent faces, pairs of said faces having a spaced arrangement and between which may rest can bodies and can ends in spaced arrangement and supported from said tapered faces and seaming mechanism for uniting said can ends with said can bodies after they have been assembled together.

10. In a machine for closing filled oval cans, the combination of a closing head, an endless chain conveyer movable therepast and having downwardly converging edges adapted to maintain the cans and ends in spaced arrangement with their longer axes in accurate registration, and means at the seaming station for lifting the can into engagement with the end.

11. In a machine for closing filled oval cans, the combination of a closing head, an endless chain conveyer movable therepast and having downwardly converging edges adapted to maintain the cans and ends in spaced arrangement with their longer axes in accurate registration, and means at the seaming station for lifting the can into engagement with the end, said means in lifting the can end bringing the shorter axes in accurate registration.

12. In a machine for closing cans, the combination of seaming mechanism and an endless chain conveyer for carrying cans thereto, said conveyer having means for holding non-circular cans and ends in alinement, for the application of the same together to close the cans, consisting of two series of parallel blades having shoulders and above said shoulders can end engaging, centering and supporting parts, two pairs of said blades holding between them a can body and can end in alinement, and a lifter operating upward between said parts of blades to lift a can body to the alined can end and thence to the seaming mechanism.

13. In a machine for closing cans, the combination of seaming mechanism and an endless chain conveyer for carrying cans thereto, said conveyer having means for holding non-circular cans and ends in alinement, for the application of the same together to close the cans, consisting of two series of adjustable supports having shoulders and above said shoulders can end engaging, centering and supporting parts, two pairs of said supports holding between them a can body and can end in alinement, and a lifter operating upward between said pairs of supports to lift a can body to the alined can end and thence to the seaming mechanism.

14. In a machine for closing cans, the combination of seaming mechanism and an endless chain conveyer for carrying cans thereto, said conveyer having means for holding non-circular cans and ends in alinement, for the application of the same together to close the cans, consisting of two series of supports having shoulders and above said shoulders can end engaging, centering and supporting parts which are inclined and form a can end receiving space which narrows downward, two pairs of said supports holding between them a can body and can end in alinement, and a lifter operating upward between said pairs of supports to lift a can body to the alined can end and thence to the seaming mechanism.

15. In a machine for closing cans, the combination of seaming mechanism and an endless chain conveyer for carrying cans thereto, said conveyer having means for holding non-circular cans and ends in alinement, for the application of the same together to close the cans, consisting of two series of supports having holding means for the can bodies and at a higher level inclined can end engaging, centering and supporting parts, two pairs of said supports holding between them a can body and can end in alinement, and a lifter operating upward between said pairs of supports to lift a can body to the alined can end and thence to the seaming mechanism.

16. In a machine for closing cans, the combination of seaming mechanism and an endless chain conveyer for carrying cans thereto, said conveyer having means for holding non-circular cans and ends in alinement, for the application of the same together to close the cans, consisting of two series of supports having means for supporting the can bodies and at a higher level can end engaging, centering and supporting parts, said supports being readily removable, two pairs of said supports holding between them a can body and can end in alinement, and a lifter operating upward between said pairs of supports to lift a can body to the alined can end and thence to the seaming mechanism.

17. In a machine for closing cans, the combination of seaming mechanism and an endless chain conveyer for carrying cans thereto, said conveyer having means for holding non-circular cans and ends in alinement, for the application of the same together to close the cans, consisting of two series of supports having holding means for the can bodies and at a higher level at four isolated points can end engaging, centering and supporting parts, two pairs of said supports holding between them a can body and can end in alinement, and a lifter operating upward between said pairs of supports to lift a can body to the alined can end and thence to the seaming mechanism.

18. In a machine for closing cans, the combination of seaming mechanism and an endless chain conveyer for carrying cans thereto, said conveyer having means for holding non-circular cans and ends in alinement, for the application of the same together to close the cans, consisting of two series of parallel blades having shoulders and above said shoulders inclined can end engaging, centering and supporting parts arranged at four isolated points, two pairs of said blades holding between them a can body and can end in alinement, and a lifter operating upward between said pairs of blades to lift a can body to the alined can end and thence to the seaming mechanism.

19. In a machine for closing cans, the combination of seaming mechanism and an endless chain conveyer for carrying cans thereto, said conveyer having means for holding non-circular cans and ends in alinement, for the application of the same together to close the cans, consisting of two series of supports having at four isolated points inclined edges for holding the can bodies and the can ends spaced and alined above said bodies, and a lifter operating upward between said supports to lift a can body to the alined can end and thence to the seaming mechanism.

20. The combination, with can closing mechanism, of an endless series of supports linked one to another, adapted to be operated to carry can bodies, and can ends spaced and alined above said bodies, said supports having inclined edges engaging the bodies and ends on opposite sides thereof at a plurality of isolated points and centering the same, and mechanism operating said supports and can closing mechanism in timed relation.

21. The combination, with can closing mechanism, of an endless can-body conveyer having a series of supports for the can bodies and having an independent series of can-end centering supports which center the can end relative to the can body and support the can end at a distance above said body.

PAUL W. FLEISCHER.